United States Patent
Thoen

[15] 3,662,610
[45] May 16, 1972

[54] MULTI-TURN LIMIT STOP APPARATUS

[72] Inventor: Richard Thoen, Golden Valley, Minn.
[73] Assignee: Honeywell Inc., Minneapolis, Minn.
[22] Filed: Apr. 20, 1970
[21] Appl. No.: 29,956

[52] U.S. Cl. ................................................74/10.2, 74/526
[51] Int. Cl. .........................................................F16h 35/18
[58] Field of Search ..........................................74/10.2, 526

[56] References Cited

UNITED STATES PATENTS

| | | | |
|---|---|---|---|
| 2,844,038 | 7/1958 | Danta | 74/10.2 |
| 3,411,366 | 11/1968 | Leto | 74/10.2 |

*Primary Examiner*—Milton Kaufman
*Attorney*—Charles J. Ungemach, Ronald T. Reiling and Albin Medved

[57] ABSTRACT

A high turns ratio, limit stop mechanism, comprising a pinion, a gear in engagement with the pinion, and stop members affixed to the pinion and gear. The ratio of the number of gear teeth to the number of pinion teeth is not an integer. The stop member affixed to the pinion extends beyond the periphery of the pinion and sweeps out an epitrochoidal path with respect to the gear pitch circle as it rotates. The stop member affixed to the gear is positioned inside the gear pitch circle. Since the ratio is non-integral, the epitrochoidal loops of the pinion stop member rotate with respect to the gear pitch circle on each gear revolution. Rotation in one direction is limited when the epitrochoidal path for the pinion stop member on a particular rotation enchoses the gear stop member.

6 Claims, 4 Drawing Figures

PATENTED MAY 16 1972 3,662,610

INVENTOR.
RICHARD L. THOEN
BY Ronald T. Reiling
ATTORNEY

MULTI-TURN LIMIT STOP APPARATUS

BACKGROUND OF THE INVENTION

This invention is properly classed in the field of mechanical limit stops, more particularly, as a limit stop mechanism which controls the number of turns of a rotary member. More specifically, the invention is intended to limit rotary member rotation in a drive train in which at least two rotary members have a high turns ratio between them.

Power trains of limited rotation are frequently used in servomechanism design, for example, to protect the delicate mechanism of a potentiometer linked to a power train. In the prior art, power train rotation was typically limited by a single turn stop on the output shaft or a multiple-turn stop on the input shaft.

A simple form of single turn stop involves the use of fingers attached to the output gear and pinion of a power train so that the fingers meet and limit rotation after slightly less than one turn of the output gear. Such a mechanism, while simple and inexpensive of construction, has the disadvantage that the output gear is limited to one turn, and furthermore, since the finger on the output shaft is moving at low velocity and high torque, a torque limiter is normally required to prevent damage to the power train upon finger impact. Therefore, multi-turn stop mechanisms further up the power train are frequently used.

One example of a prior art multi-turn stop mechanism is the "traveling nut" device, which consists of a threaded shaft coupled to an input shaft and a nut which moves along the threaded shaft, engaging stop members at the extremes of the nut travel. A second example of a prior art multi-turn stop mechanism is an arrangement in which a number of pinned fingers are carried on a shaft coupled to a high velocity shaft of a power train. The first of these pinned fingers is fixed to the shaft, and the last finger is fixed to a rigid frame. Each successive finger lies within the cylinder of rotation of the adjacent finger pin. In operation, after slightly less than one rotation the first finger pin comes into contact with the second finger, picks it up, and both fingers are carried through slightly less than another rotation. In a like manner, the second finger pin picks up the next adjacent finger until finally the last pin contacts the frame, and limits further rotation in that sense. While these multi-turn stop mechanisms require no torque limiter, they occupy a large amount of space, and are expensive to fabricate. Furthermore, since they have a large mass which is rotating about a high velocity shaft, these stop mechanisms add considerable inertia to the power train.

Yet another form of prior art multi-turn stop mechanism consists of two fingers affixed to gears having a non-integral turns ratio. Since the ratio is non-integral, the fingers change position with respect to each other on each rotation, and eventually engage to limit rotation in one direction. In the prior art, this form of stop mechanism has been limited to use with mating gears of nearly equal diameter. If gears of substantially different pitch diameters are used, significant problems arise. Suppose that a limit stop mechanism is desired on a pinion-gear combination in which the pinion pitch diameter is less than one-third that of the gear pitch diameter. Since the angular rates of rotation of mating gears are inversely proportional to their pitch diameters, a finger affixed to the pinion has an angular velocity more than three times that of the finger affixed to the gear. This typically causes the pinion stop finger to interfere with the gear stop finger even on gear rotations where the fingers are out of phase. Furthermore, if the overlap of the gear and pinion fingers is reduced in an attempt to avoid interference, the point at which the fingers engage approaches the straight line connecting the gear and pinion axes of rotation, and wedging of the stop fingers is the likely result. The disadvantage of such an effect is that high torque in the opposite direction is necessary to free the wedged fingers. This limitation to mating gears of nearly equal diameter means that, in the prior art, when the multiple turn stop function was desired, a minimun of three gears was necessary, two of nearly equal diameter with fingers to obtain the stop function, and third gear of increased diameter to obtain the reduction desired.

Applicant has discovered that through proper placement and shaping of the gear and pinion stop members, a high ratio multi-turn stop mechanism may be constructed. Unlike the stop mechanisms above-described, the present invention requires no torque limiter. Also, because of its uncomplicated construction it has low reflected inertia and is relatively inexpensive to build.

SUMMARY OF THE INVENTION

The high ratio, multi-turn stop mechanism comprises a mating gear and pinion and two stop members, one each affixed to the side faces of the pinion and gear. The gear and pinion are of non-integral ratio, that is, the turns ratio obtained by dividing the number of gear teeth by the number of pinion teeth is a mixed number. The pinion stop member extends beyond the periphery of the pinion, and during rotation its outermost segment sweeps out a number of epitrochoidal loops spaced about the gear pitch circle. Each of these loops extends towards the gear axis of rotation so that the minimum distance between the axis and the loops is less than the gear pitch radius. The gear stop member is placed on the gear inside the gear pitch circle, yet outside the minimum distance between these loops and the gear axis. Since the ratio between the pinion and gear is non-integral, the epitrochoidal loops made by the pinion stop member outermost segment shift with respect to the gear on successive rotations, sweeping out different areas adjacent to the gear face. When the area to be swept out on a particular gear rotation includes that occupied by the gear stop member, the two members engage to limit further rotation in that direction. In order for the invention to function as a multi-turn stop mechanism, the gear stop member must be positioned within only one of these epitrochoidal loops. A gear stop member so positioned acts as a stop whenever the pinion stop member attempts to sweep through the area where it is located. Since the loops shift for each gear rotation, rotation in the opposite direction after stop member engagement occurs in one direction, will, after a number of gear revolutions, result in another loop substantially coincident with the one swept out when stop contact last occurred. The number of gear rotations stop-to-stop is approximately equal to the denominator of the fractional part of the turns ratio, when that fraction is reduced to lowest terms.

BRIEF DESCRIPTION OF THE DRAWING

The nature of the invention and distinguishing features and advantages thereof will be more clearly understood from the following detailed description and accompanying drawing in which.

DESCRIPTION OF THE PREFERRED EMBODIMENT

Figure 1:
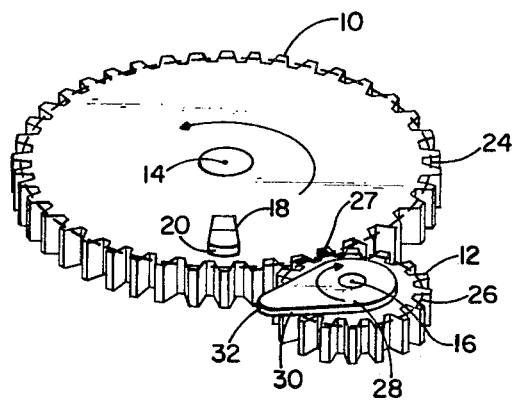
FIG. 1 is a perspective view of a preferred embodiment of the high ratio, multi-turn stop mechanism.

Referring now to the embodiment shown in FIG. 1, a first rotary member 10, such as circular gear, is in peripheral engagement with a second rotary member 12, such as a circular pinion. The peripheral engagement between the first rotary member 10 and the second rotary member 12 couples the rotation of the two members, and results in a fixed turns ratio between them. The turns ratio of the pinion 12 to the gear 10 is equal to the number of rotations of the pinion 12 which occur during one 360° rotation of the gear 10. In the case of gears, the turns ratio is also equal to the reciprocal of the ratio of the pitch radii. The turns ratio of the pinion 12 to the gear 10 is a mixed number substantially greater than one. The gear 10 and pinion 12 are mounted for rotation about axes of rotation 14 and 16, respectively. A first stop member 18 is affixed to the side face of gear 10. Stop member 18 has a contact surface 20, which may be convex, such as a segment of a circle with its center at axis 14. The gear 10 and pinion 12 have pitch circles 24 and 26 respectively. These circles are the circles on gears which bear such a relation to each other that points on them have a common linear velocity during rotary member rotation. Pitch circles 24 and 26 have a point of tangency 27. The contact surface 20 preferably lies entirely within the pitch circle of the gear 10. In other words, it lies entirely within a cylinder defined by the locus of points at a certain radius from the gear axis 14. The radius of that cylinder is given by the expression (D/(1+R)), where D is the distance between axes 14 and 16, and R is the turns ratio of the gear 10 to the pinion 12. In the case of one type of rotary means, a mating gear and pinion, this radius is the gear pitch radius. A second stop member 28 is affixed to the pinion 12. The stop member 28 has a contact surface 30. The outermost segment 32 of contact surface 30 consists of those points on the contact surface which are at the maximum distance from the axis of rotation 16. The distance from the outermost segment 32 of the contact surface 30 to pinion axis 16 is less than the distance from gear axis 14 to any point on the contact surface 20. Contact surface 30 and contact surface 20 interfere in rotation, that is, the ideal curves generated by points on the contact surfaces 20 and 30 during rotation intersect at least twice during one complete rotation on the gear 10.

Figure 2:
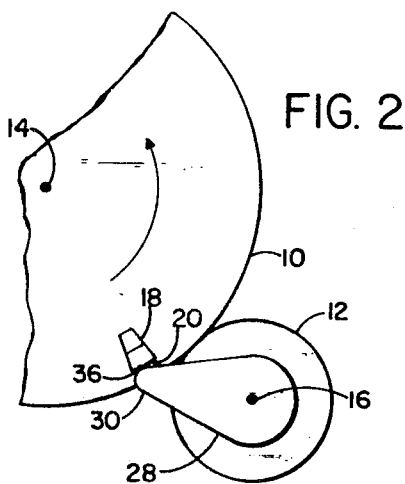
FIG. 2 is an illustration of a portion of the FIG. 1 embodiment when viewed along the axes of gear and pinion rotation.

FIG. 1 shows a preferred embodiment of the invention in a condition where the stop members are approximately one-quarter of a clockwise turn of the pinion away from engagement. In FIG. 2, a portion of the FIG. 1 embodiment is shown with the stop members engaged to limit further clockwise rotation of the pinion. An engagement segment 36 exists where the surfaces 20 and 30 of the stop members 18 and 28 contact each other. Depending upon the shape of the contact surfaces, the engagement segment may be a point, line, or area. In the embodiment shown, where the contact surfaces 20 and 30 are convex and are parallel to the gear and pinion axes of rotation 14 and 16, segment 36 is ideally a line parallel to these axes.

OPERATION

For purposes of illustrating operation, consider a power train in which the gear has 81 teeth and the pinion has eight teeth. Their turns ratio is a mixed number, in this case 10 ⅛. On successive turns of the gear, points on the pinion pitch circle are 45 angular degrees advanced with respect to the points on the gear pitch circle which they contacted on the previous turn. Since the stop members are affixed to the gear and pinion, they also shift in angular position with respect to one another during rotation. Suppose that the gear and pinion are initially positioned with the two stop members engaged as shown in FIG. 2, limiting further rotation of the gear in a counter-clockwise direction. When the gear is driven clockwise for one rotation, the pinion stop member is one-eighth turn or one tooth ahead of the stop member and there is clearance between them. On the next or second clockwise rotation, of the gear, the pinion stop member is one-quarter turn past the point of tangency of the pitch circles when the gear stop members arrives there. This shifting continues until on the eighth rotation of the gear the pinion has gained eight teeth or one complete pinion rotation. The two stop members are again in phase and come into contact during this rotation to limit further rotation in the clockwise sense.

Figure 3:
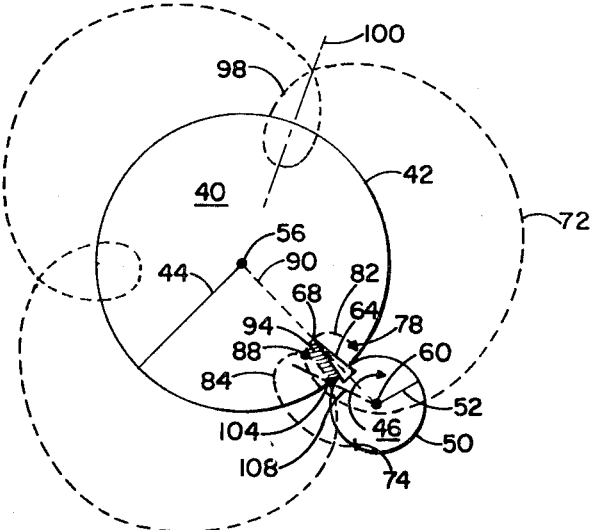
FIG. 3 is a simplified view of the FIG. 1 embodiment showing the curve generated by a point on the pinion stop member as the point moves with respect to the gear pitch circle during operation with the gear pitch circle taken as a stationary frame of reference.
Figure 4:
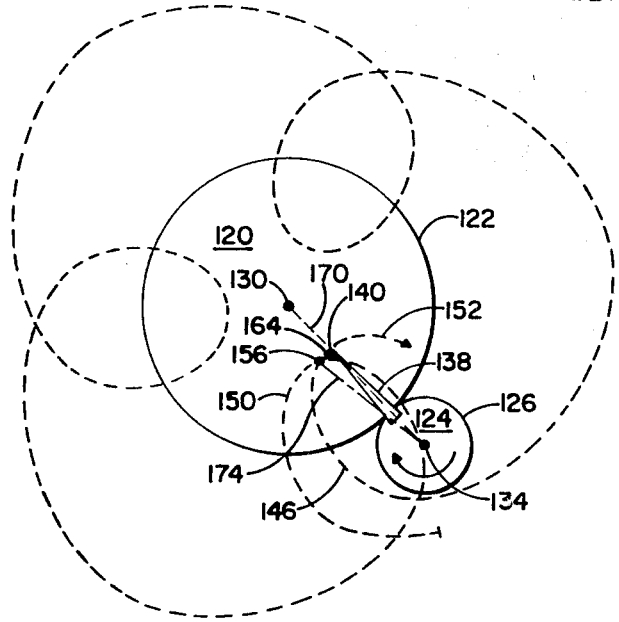
FIG. 4 is an illustration similar to that shown in FIG. 3, for a pinion stop member with greater extension beyond the pinion periphery than the pinion stop member of FIG. 3.

It is clear that there are practical limitations on the width and placement of the gear and pinion stop members which must be satisfied in applicant's invention is to function as a multiple turn stop mechanism. For example, if the pinion stop member is longer than the distance between the gear and pinion axes, there is no space available for the gear stop member. FIG. 3 and FIG. 4 are simplified schematics of applicant's invention, in which the practical limitations upon pinion stop extension, gear stop width, and engagement segment are illustrated.

Referring now to FIG. 3, a circular gear 40 having a pitch circle 42 and pitch radius 44 is shown. The circular gear 40 is in meshing engagement with a circular pinion 46 having a pitch circle 50 and pitch radius 52. The gear ratio, equal to the ratio of gear pitch radius 44 to pinion pitch radius 52, is a mixed number greater than two. The circular gear 40 and the circular pinion 46 rotate about axes 56 and 60 respectively. Affixed to the circular pinion 46 is a stop member 64. The stop member 64 has an outermost point 68. Taking the pitch circle 42 as a stationary frame of reference, rotation of the pinion 46 in engagement with gear 40 results in revolution of the pinion 46 and pinion axis 60 about gear axis 56. During rotation, an epitrochoidal path 72 is traversed by the point 68 as it moves with respect to the gear pitch circle 42. The epitrochoidal path 72 is shown for slightly more than one revolution of the pinion 46 about the pitch circle 42, commencing at a point 74 and continuing generally clockwise to an arrow 78. Two loops 82 and 84 of the epitrochoidal path on successive gear rotations are shown. Since the gear ratio of the gear to the pinion is a mixed number, the loops 82 and 84 of the epitrochoid on successive gear rotations are not coincident. They are in fact angularly displaced from one another by a fraction of one gear rotation, that fraction being the product of the inverse of the gear ratio and the fractional part of the ratio. Depending upon the angular displacement of the loops and their width, the loops 82 and 84 of the epitrochoid on successive gear rotations may intersect inside the gear pitch circle at a point 88. In order for the pinion stop to clear the gear stop member on the first gear rotation after engagement, the gear stop member must lie in only one of the epitrochoidal loops 82 and 84. If the gear stop member is positioned outside both loops engagement of the contact surfaces can never occur. On the other hand, if the stop were placed in the area common to both loops, rotation of the multi-turn stop mechanism is limited to slightly less than one gear rotation. A dashed line 90 extends between axes of rotation 56 and 60. Of the portion of the loop 82 to the left of the line of axes 90, that available for gear stop placement is indicated by the shaded section designated 94. Shaded section 94 is bounded by a small portion of pitch circle 42, epitrochoidal loop 84 between point of intersection 88 and pitch circle 42, that portion of epitrochoidal loop 82 which lies between point of intersection 88 and line of axes 90, and line of axes 90 between its intersection with loop 82 and its intersection with pitch circle 42. An epitrochoidal loop designated 98 is shown with a loop axis 100, which is a straight line along the axis of symmetry of loop 98. A point designated 104 is placed at the intersection of pitch circle 42 and epitrochoidal loop 84, and a radial line 108 projects from axis 60, passing through point 104.

Although the condition that the gear stop must lie in only one epitrochoidal loop to achieve the maximum number of gear rotations has been discussed in terms of clearance with the loops on successive rotations, a more general statement of the condition is that a gear stop member which lies in one epitrochoidal loop should not extend into any other non-coincident epitrochoidal loop. To illustrate this, consider the case of a circular gear with 83 teeth meshing with a pinion having eight teeth. Suppose that the gear and pinion have stop members affixed to them which are initially in contact, limiting further counter-clockwise rotation of the gear. Upon rotating the gear in a clockwise sense from this point, after one gear rotation the pinion stop member will sweep out a loop which is displaced three gear teeth from the loop in which the gear stop member is located. In this case, the minimum clearance occurs after three gear rotations since at that point, the pinion stop member is displaced nine teeth, or 1 ⅛ pinion rotations, and a loop displaced only one tooth from the loop enclosing the gear stop member will be swept out. Thus, the epitrochoidal loop which limits gear stop member width is not necessarily the loop on the successive rotation after stop contact. It is the closest non-coincident loop which is obtained by rotation of the pinion about the gear. Furthermore, in practice the pinion stop member will not taper to a point as shown in FIG. 3. Thus the available space for the gear stop member is additionally limited by the physical size of the pinion stop member necessary to prevent it from shearing when the stop members engage.

Clearance of the stop member contact surfaces on gear rotations when they are out of phase is not the only condition which should be satisfied to insure a practical multi-turn stop mechanism. Wedging of the stop member contact surfaces should also be prevented. This wedging may occur when one stop member has a high component of momentum directed tangential to the other member contact surface at impact, and the point of impact is located close to a straight line joining gear and pinion axes of rotation. The smaller the engagement angle i.e., the acute angle with its vertex at the pinion axis of rotation 16 and its sides extending through the gear axis of rotation 14 and the point where the contact surfaces engage, the more prone the stop mechanism becomes to wedging. This is true because the component of reaction force transmitted back from the pinion and gear axes is normal to the surfaces when contact occurs on the line between the gear and pinion axes, and no force acts to free the stop members for reverse rotation. The wedging effect becomes significant when the reflected force tending to free the engaged stop members for rotation in the opposite direction when the driving torque ceases is less than the frictional force between the engaged stop members. This limitation can be phrased in terms of a critical engagement angle for the mating gear and pinion, which is the engagement angle at which the component of reflected force directed perpendicular to the line of axes 14 and 16 and acting at the engagement segment is less than the frictional force between the engaged stop members. This frictional force is equal to the component of reflected force along line of axes 14 and 16 multiplied by the coefficient of friction between the surfaces.

Two important factors which effect the space available for the gear stop member are the distance the pinion stop extends beyond the pinion pitch circle and the magnitude of the fractional part of the turns ratio. Increasing the extension of the pinion stop while holding the dimensions of gear and pinion constant makes the mechanism more prone to wedging, since there is significantly less space for the gear stop member at a safe distance from the line of axes. FIG. 4 illustrates this effect since it is a representation similar to that of FIG. 3 except that the pinion stop member has increased length. In that figure, a gear 120 having a pitch circle 122 and a pinion 124 having a pitch circle 126 are in meshing engagement. The dimensions of the gear 120 are identical to those of the gear 40 of FIG. 3, and the dimensions of pinion 124 are identical to those of the pinion 46 of FIG. 3. The gear 120 and the pinion 124 rotate about axes 130 and 134, respectively. Affixed to the pinion 124 is a pinion stop member 138, which has an outermost point 140. The outermost point 140 sweeps out an epitrochoidal path 146 as the pinion rotates with respect to the gear. The path is shown for slightly more than one revolution of pinion about the large gear and has loops 150 and 152 of the epitrochoid on successive rotations. These two loops intersect inside the gear pitch circle at a point 156. Dashed lines 170 and 174 project from pinion axis 134, extending through gear axis 130 and point 156 respectively. It is readily apparent that the space available for the gear stop 164 is decreased by increasing the extension of the pinion stop member 138. Thus from a practical standpoint, it is preferable to have the pinion stop member projecting only a small fraction of the gear pitch radius beyond the pinion pitch radius, and to position the gear stop member as close as practicable to the gear pitch circle.

This limitation of the pinion stop member extension may be phrased in terms of the critical engagement angle at which the wedging effect becomes undesirable. For proper operation, there must be at least one point in the area common to only one epitrochoidal loop and the gear pitch circle such that the angle defined by a straight line through that point and the pinion axis of rotation and a straight line passing through that pinion and gear axes is greater than the critical engagement angle previously defined. In FIG. 3, the maximum angle available is defined by the acute angle between dashed lines 90 and 104. In FIG. 4, dashed lines 170 and 174 show the maximum angle available.

Various shapes of the pinion stop contact surface and gear stop contact surface may be used in embodiments of this invention. One combination which the applicant has found to be particularly satisfactory is the use of a contact surface on the gear stop which is a segment of a circle with its center at the gear axis of rotation, and a pinion stop contact surface which is a segment of a circle with its center slightly outside the pinion pitch circle. In order that both clockwise and counter-clockwise rotation be free from wedging, it is convenient to have the gear stop member contact surface shaped so that is is symmetrical about the axis of the epitrochoidal loop in which it is placed. Referring to FIG. 2, and assuming loop 98 has been chosen for the gear stop, then a preferred arrangement would be to have the stop contact surface symmetrical about the epitrochoid axis 100. Furthermore, the pinion stop member contact surface should be symmetrical about a radial line extending from the pinion axis to the outermost segment of the pinion stop contact surface. This insures that the engagement angle will be identical for both counter-clockwise and clockwise rotation.

The maximum number of turns of the large gear stop-to-stop is related to the fractional part of the gear ratio. Since the stop members clear each other only when out of phase with one another, whenever the fractional parts add up to an integral number of pinion turns, rotation will be limited. Therefore the number of turns available is approximately equal to the smallest integer which, when multiplied by the fractional part of the gear ratio, gives an integral product. Thus, when the fractional part of the gear ratio is three-eighths, the stop mechanism is capable of approximately eight turns stop-to-stop. Another way of stating this result is that the approximate number of gear turns available is equal to the denominator of the fractional part of the turns ratio, when that fraction is reduced to lowest terms. Actually, the number of turns is less than that figure by the sum of the engagement angles limiting clockwise and counter-clockwise rotation.

It is to be understood that the arrangements described above are merely illustrative of the application of the principles of this invention. Other arrangements may be devised by those skilled in the art without departure from the spirit and scope of the invention.

What is claimed is:

1. A multi-turn stop mechanism comprising:
   a. first rotary means having a first axis of rotation;
   b. second rotary means having a second axis of rotation parallel to the first axis of rotation;
   c. means for coupling the first rotary means to the second rotary means so that there is a turns ratio between them, with the turns ratio of the second rotary means to the first rotary means a mixed number substantially greater than one;
   d. a first stop member affixed to the first rotary means, said first stop member having a first contact surface lying entirely within a cylinder defined by all points which are at a radius from the first axis of rotation equal to the quotient obtained in division of the distance between the first and second axes of rotation by the sum of the inverse of the turns ratio and the integer one;
   e. a second stop member affixed to the second rotary means, said second stop member having a second contact surface which may interfere in rotation with the first stop member contact surface, said stop member contact surface having an outermost segment, with the distance from the second contact surface outermost segment to the second axis of rotation less than the distance from the first axis of rotation to those points on the first stop member contact surface furthest away from said first axis, whereby the two contact surfaces engage, limiting rotation in one sense, after a number of first rotary means rotations greater than one.

2. The apparatus of claim 1 wherein the first rotary means is a circular gear having a pitch circle, the second rotary means is a circular pinion, so that the radius of the cylinder within which the first contact surface lies is equal to the pitch radius of the circular gear pitch circle.

3. In combination with a power train of the type wherein a circular gear mounted for rotation about a first axis and having a first pitch radius is in meshing engagement with a circular pinion mounted for rotation about a second axis, said pinion having a second pitch radius, with the ratio of the first pitch radius to the second pitch radius a mixed number greater than two, the improvement which comprises:
   a. a first stop member which rotates with the circular gear, said first stop member having a first contact surface positioned such that the distance from the first stop member contact surface to the first axis of rotation is less than the first pitch radius;
   b. a second stop member which rotates with the circular pinion, said second stop member having a second contact surface positioned so that the first contact surface and the second contact surface interfere in rotation, the distance from the second stop member contact surface to the second axis of rotation being less than the distance from the first stop member contact surface to the first axis of rotation, the second stop member contact surface having an outermost segment which, with respect to a frame of reference fixed on the circular gear pitch circle, moves with the circular pinion in revolution about the circular gear during gear rotation, said outermost segment sweeping out a plurality of epitrochoidal loops with respect to the reference frame during gear rotation, whereby the rotation of the power train in either sense is limited to a number of circular gear rotations greater than one.

4. The apparatus of claim 3 wherein the first stop member contact surface is a segment of a cylinder whose axis is coincident with the circular gear axis, and the second stop member contact surface is a segment of a cylinder whose axis lies outside the pinion pitch circle.

5. The apparatus of claim 3 wherein the first stop member contact surface is positioned to lie within only one of the epitrochoidal loops generated by the second stop member contact surface during a number of gear rotations equal to the denominator of the fractional part of the turns ratio, when that fraction is reduced to lowest terms.

6. The apparatus of claim 5 wherein the epitrochoid axis of the epitrochoidal loop within which the first stop member contact surface lies is perpendicular to said first axis, and the first stop member contact surface is configured to be symmetrical about the epitrochoid axis.

* * * * *